United States Patent [19]

Johnssen

[11] Patent Number: 5,795,666
[45] Date of Patent: Aug. 18, 1998

[54] MODULAR POWER STATION FOR THE PRODUCTION PRIMARILY OF HYDROGEN FROM SOLAR ENERGY AND A METHOD OF GENERATING ELECTRIC ENERGY

[75] Inventor: Wolf Johnssen, Munich, Germany

[73] Assignee: Hannelore Binsmaier nee Gallin-Ast, Erdweg-Grossberghofen, Germany

[21] Appl. No.: 663,203

[22] PCT Filed: Nov. 12, 1994

[86] PCT No.: PCT/EP94/03766

§ 371 Date: Jul. 10, 1996

§ 102(e) Date: Jul. 10, 1996

[87] PCT Pub. No.: WO95/15590

PCT Pub. Date: Jun. 8, 1995

[30] Foreign Application Priority Data

Dec. 4, 1993 [DE] Germany ............... 43 41 438.9

[51] Int. Cl.$^6$ ............................................. H01M 8/06
[52] U.S. Cl. .................. 429/17; 429/13; 429/19; 429/26; 429/41
[58] Field of Search .................. 429/13, 17, 19, 429/26, 41

[56] References Cited

U.S. PATENT DOCUMENTS 4,988,580  1/1991  Ohsaki et al. .
5,409,784  4/1995  Bromberg et al. ............... 429/13
5,554,453  9/1996  Steinfeld et al. ............... 429/17

FOREIGN PATENT DOCUMENTS 0 564 796 A1  10/1993  European Pat. Off. .
57-078773  5/1982  Japan .
WO 95/06334  3/1995  WIPO .

OTHER PUBLICATIONS

Fuel Cell Energy Recovery From Landfill Gas, by G.J. Sandelli, Journal of Power Sources, 37 (1992) 255–264 (Month N/A).

Potential Biomass Resources of Sicily for Electric–Power Generation, by Alderucci et al., Applied Energy 45 (1993) 219–240 (Month N/A).

Assessment of Biomass–Based Fuel Cell Power Systems, by Edward I. Wan, Energy Biomass Wastes 9(1995) (Month N/A).

*Primary Examiner*—M. Nuzzolillo
*Attorney, Agent, or Firm*—Herbert Dubno

[57] ABSTRACT

A modular power station for the production primarily of hydrogen from solar energy. A conversion module converts solar energy into biomass which is gasified in a gasification module and the hydrogen resulting from the gasification is separated out and stored. The hydrogen can be used for generating electrical energy in a fuel cell.

4 Claims, 3 Drawing Sheets

MODULAR POWER STATION FOR THE PRODUCTION PRIMARILY OF HYDROGEN FROM SOLAR ENERGY AND A METHOD OF GENERATING ELECTRIC ENERGY

CROSS REFERENCE TO RELATED APPLICATIONS

This application is a national phase of PCT/EP94/03766 filed 12 Nov. 1994 and based, in turn, upon German national application P4341438.9 of 4 Dec. 1993 under the International Convention.

FIELD OF THE INVENTION

The present invention relates to a modular power station for the production primarily of hydrogen using solar energy. "The production primarily of hydrogen" means that hydrogen is the actual product for which the process is intended. "Modular power station" means that the power station comprises a number of modules serving various functions, and from which the power station can be assembled by a building-block system from such modules. The modules are mass-produced components. Of course, they are connected by operational lines and control lines. The invention also relates to a method of generating electric energy by means of such a modular power station.

BACKGROUND OF THE INVENTION

There is no known modular power station primarily for the production of hydrogen from solar energy. However, known solar power stations comprise a number of similar components or solar collectors for collecting solar energy, which is converted into electric energy by a photoelectric effect or by a thermal effect using heat engines. Other known power stations comprise at least one reactor for gasifying fossil fuels and also biomass to obtain fuel gas, which is utilized, e.g. by circulation through heat engines.

"Biomass" is a general term denoting all regenerative raw materials, i.e. materials which can be repeatedly produced by biological means, at a substantially predictable production rate depending on the vegetation periods of a region. Biomass is therefore contrasted with fossil raw materials, which are formed much more slowly than used. A biomass can be made available with substantially intact cell structure or with a disintegrated structure, e.g. in the form of a fine powder. Biomass consists mainly of the elements carbon, hydrogen, oxygen and nitrogen, and is low in protein and sulphur. In the invention, "biomass" is used particularly to mean C-4 plants and lignin-rich plants. In the invention, perennial plants in particular are used to produce biomass.

Molecular hydrogen is not available as a raw material for generating energy, but has to be obtained from hydrogen-containing raw materials. Production of hydrogen from water by normal electrolysis uses more current than can be generated by the hydrogen, and must therefore be ruled out from the start. Catalytic splitting of water into hydrogen and oxygen is very slow and yields only small amounts of hydrogen at high cost, and is therefore unattractive for commercial use. It has long been known to use coal to generate synthesis gas, consisting mainly of hydrogen and carbon monoxide, and a plant required for this is also known. This process is called coal gasification. In a water-shift reaction, the carbon monoxide in synthesis gas can be converted to hydrogen and carbon dioxide by adding water vapor at elevated temperature. The carbon dioxide can easily be removed. The hydrogen produced can be used for the most diverse purposes, more particularly for generating electric energy by means of fuel-cells or for operating internal combustion engines.

Hydrogen has hitherto been produced centrally in large plants usually based on fossil fuels.

OBJECT OF THE INVENTION

The object of the invention is converting solar energy decentrally and by a simple method into primarily hydrogen.

SUMMARY OF THE INVENTION

This object is attained according to the invention with a modular power station for the production primarily of hydrogen from solar energy comprising a) a conversion module for converting solar energy to biomass sufficiently free from native sulphur, the conversion module being in the form of an agricultural cultivation surface for growing plants, particularly C4 plants, convertible into biomass, b) a gasification module in the form of a reactor for gasifying biomass in the presence of water vapor to obtain a hydrogen-containing fuel gas at temperatures, and at a residence time of the products for gasification in the gasification zone of the reactor, such as to suppress tar condensation in the zones of the gasification module downstream of the gasification zone and/or in a downstream module, and c) a storage module in which the fuel gas or hydrogen produced is stored.

The conversion module comprises a unit for harvesting biomass to a gasification pre-product. The gasification module is being connected by a loading device to the processing unit. The storage module being connected to the gasification module by a fuel-gas purification means. The output of the gasification module and of the storage module are adapted to one another with regard to the capacity of the plant and adjusted so that a part stream of fuel gas is usable for water-vapor generation and another part stream and/or waste heat from the modular power station is usable for drying the harvested biomass.

The conversion module is dimensioned relatively to the cultivation area in accordance with the preset capacity of the plant in each particular case, the conversion module comprises a processing unit in the form of at least one harvesting machine for the biomass and in the form of a chopper or pelleting means. It also comprises a storage means for the processed biomass so as to compensate for fluctuations in the amount of processed biomass due to the conditions of growth. The main components of the conversion module, the gasification module and the storage module are prefabricated in the form of modular power-station components which can be transported in the assembled or dismantled state. Of course, according to the invention a number of modular power stations having the construction described can be installed side by side, and the conversion module can also be designed to serve a number of modular power stations. The hydrogen produced can be used in situ or sold.

The invention is based on the discovery that solar energy can be obtained and stored extensively and in harmony with the vegetation period of a geographical zone, with little technical complexity, by using natural solar collectors, i.e. plants convertible into biomass. The thus-stored solar energy can without great expense be converted to hydrogen and stored as such and can be used as such. To this end, the individual modules are manufactured centrally and brought to the storage place or, if required, are dismantled for transport. At the place of installation, the conversion module is matched in the manner described to the power which the gasification module and the storage module are designed to provide and which to that extent is preset. The invention combines a natural process of converting solar energy with hardware elements and the resulting conversion module, with well-tried units for generating the fuel gas and hydrogen production, such units also being designed as modules.

In a preferred embodiment of the invention the gasification module is designed for allothermic gasification and is operated so that the fuel gas has a hydrogen/biomass ratio greater than unity. Advantageously the gasification module is equipped with a gasification reactor operating under pressure and using water vapor as the gasification and fluidizing agent, as is known per se in the case of fossil fuels (compare EP 0 329 673 B1). According to a preferred embodiment of the invention, the gasification module is so arranged for allothermic gasification at the lowest possible temperature that the fuel gas contains at least approximately 50% hydrogen.

The hydrogen from the fuel gas can be separated in known manner and stored under pressure in pressure vessels. Alternatively the hydrogen can be separated from the fuel gas and stored in a metal hydride.

A modular power station according to the invention can operate independently at low cost. To this end, according to the invention, a water-vapor generation module is additionally provided and is heatable by a part-stream of fuel gas. Also, the conversion module can be equipped with a drying means heated by the waste heat of the modular power station. In a modular power station according to the invention, ash is produced during gasification. It can be returned in the form of fertilizer to the conversion module. The plants convertible into biomass, more particularly "C4" plants, take 5 to 10 or more vegetation periods before they die, and before the agricultural cultivation area constituting the conversion module has to be renewed. Waste heat accumulates in the modular power station according to the invention, and can be returned to the process particularly in the case of the allothermic method.

With regard to partial oxidation, the gasification module can be operated in various embodiments. More particularly, direct partial combustion of biomass can be brought about in the oxidation reactor. In a particularly important embodiment, partial oxidation is brought about by supplying externally generated heat and a gasification agent containing mainly water vapor. This method, in another context, is known as allothermic gasification. Externally generated heat has to be supplied in allothermic gasification, since the reaction between biomass and water vapor to form fuel gas is on the whole endothermic. The heat for partial oxidation can preferably be generated by burning biomass or fuel gas. Advantageously the heat for partial oxidation is introduced into the oxidation reactor by a conventional heat-vehicle gas, via a heat-exchanger. In another embodiment of the method according to the invention, partial oxidation is brought about without a supply of externally generated heat and using a gasification agent consisting mainly of water vapour and molecular oxygen or air. This method, in another context, is known as autothermic gasification. In the process, exothermic oxidation reactions occur with the content of molecular oxygen in the gasification agent, thus producing the required heat "in situ" for the endothermic reaction between water vapor and biomass. Autothermic or allothermic gasification is known in principle from "Stahl und Eisen", Volume 110, 1990, No. 8, pages 131–136, but in another context. The modular power station according to the invention prefers allothermic gasification in order to optimize hydrogen production.

BRIEF DESCRIPTION OF THE DRAWING

The above and other objects, feature, and advantages will become more readily apparent from the following description, reference being made to the accompanying drawing in which.

SPECIFIC DESCRIPTION

Figure 1:
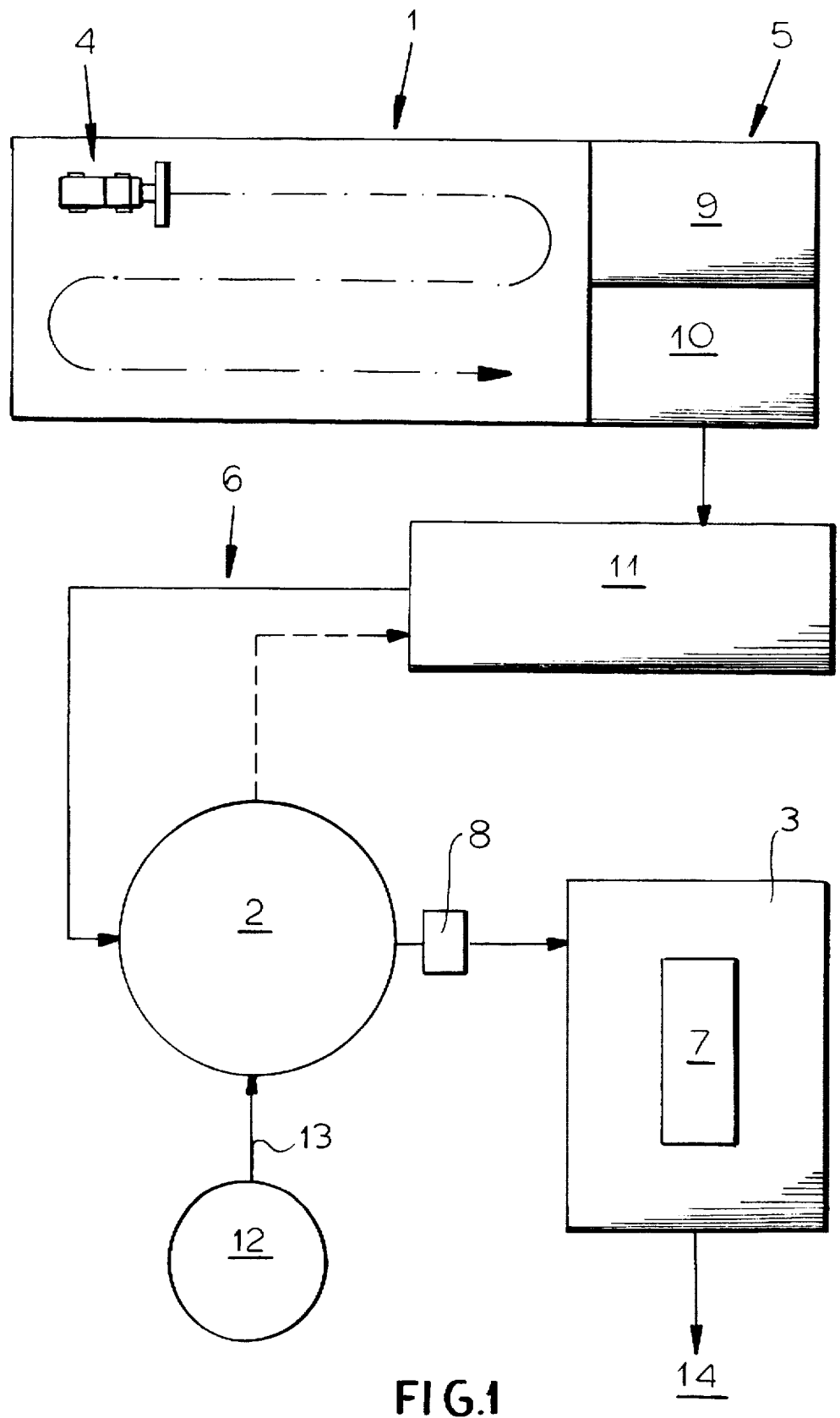
FIG. 1 is a block diagram of a modular power station according to the invention.

The drawing shows a modular power station for the production primarily of hydrogen from solar energy. The modular power station comprises three modules serving special purposes.

The first module is a conversion module 1 for converting solar energy into biomass sufficiently free from native sulphur, the conversion module being in the form of an agricultural cultural plot for growing plants, particularly C4 plants, convertible into biomass. Perennial plants will generally be used. The second module is a gasification module 2 in the form of a gasification reactor for gasifying biomass in the presence of water vapor to form a fuel gas at temperatures and at a residence time of the products for gasification in the gasification zone of the reactor such as to prevent tar condensation in the zones of the gasification module downstream of the gasification zone and/or in a downstream fuel-cell module. A storage module 3 receives the hydrogen-rich fuel gas and/or the hydrogen.

The conversion module 1 comprises a unit 4 for harvesting biomass and a processing unit 5 for converting the biomass into a gasification pre-product. The gasification module 2 is connected by a loading means 6 to the processing unit 5. The storage module 3, comprising e.g. a metal hydride storage means 7 is connected via a fuel-gas purification means 8 to the gasification module 2. In the arrangement, the output of the gasification module 2 and of the storage module 3 are adapted to one another and to the capacity of the plant and adjusted so that a part-stream of fuel gas is usable for water-vapor generation and another part-stream and/or the waste heat from the modular power station is usable for drying the harvested biomass. The storage module 3 may comprise a plurality of storage elements although this has not been shown.

The conversion module 1 comprises a processing unit 5 for the biomass in the form of a chopper 9 or pelleting means 10. The conversion module 1 also has a means 11 for storing the processed biomass, so as to compensate for fluctuations in the amount of biomass processed, due to the conditions of growth. The main components of the conversion module 1, and also of the gasification module 2 and the storage module 3, are transportable in the assembled or dismantled state and are usually prefabricated at a central place.

Figure 2:
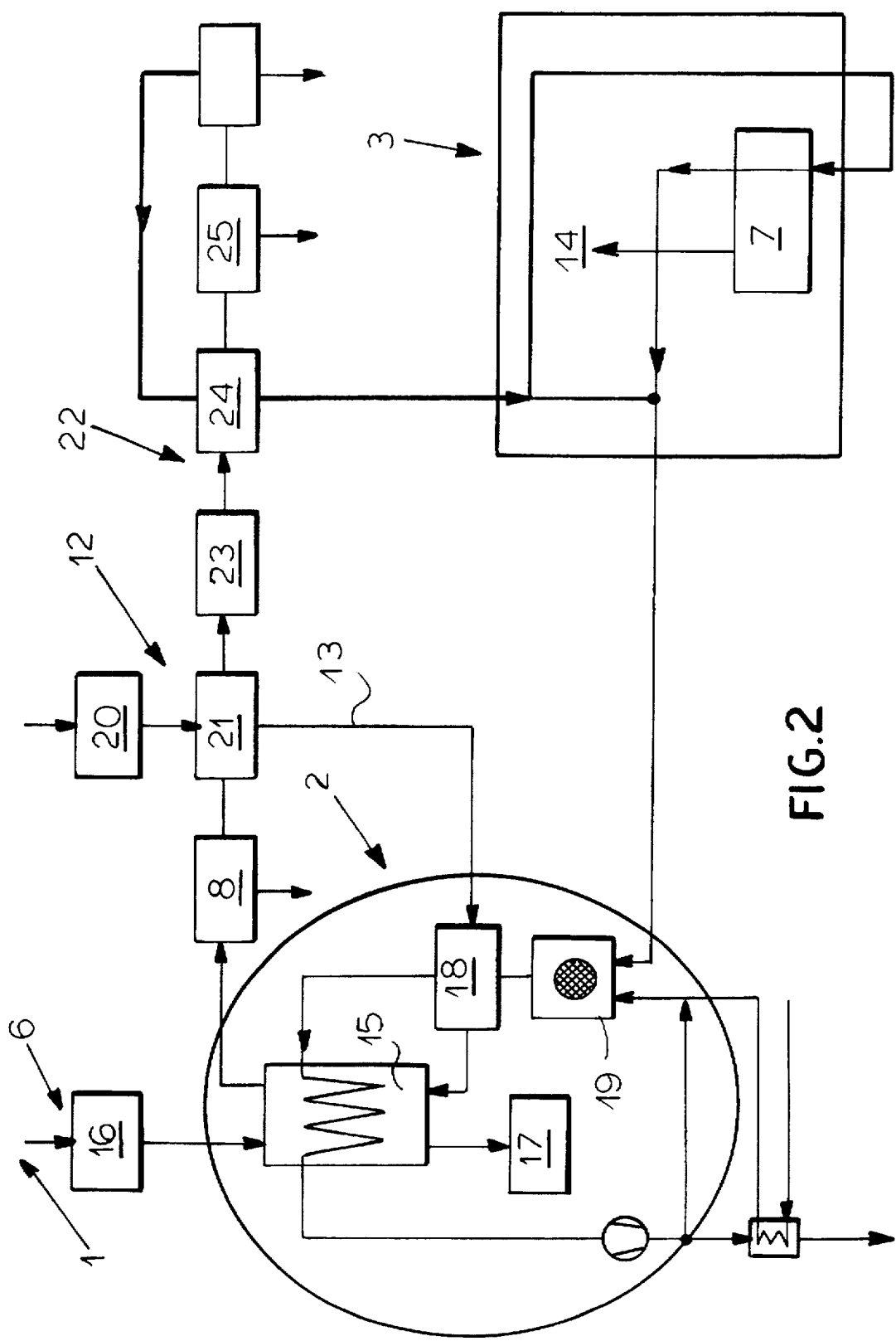
FIG. 2 is a functional diagram corresponding to FIG. 1.

As FIG. 2 shows, the gasification module 2 is designed for allothermic gasification. The actual gasification reactor 15 is generally designed for gasification under pressure using water vapor, which serves as the gasification and fluidizing agent. In addition, a water-vapor generation module 12, via a line 13, is provided in the example and is heatable by burning a part-stream of fuel gas. The waste heat can be used, as described. The hydrogen can be withdrawn from the modular power station at 14 and used in situ or supplied to a network.

FIG. 2 shows the gasification module 2, containing the gasification reactor 15, a means 16 for supplying gasification pre-products, and an ash outlet 17. A heat-exchanger 18 for superheating the water vapor is also provided. The heat-exchanger 18 is heated via a combustion chamber 19 supplied with a part-stream of fuel gas. The water required for the water vapor is supplied via a water-processing means 20 and is fed to a steam generator 21. Of course, the required pumps, valves and means for waste heat utilization are connected.

The gasification module 2 and the storage module 3 are connected by an installation 22, one important component of which is a reactor 23 in which the hydrogen content of the fuel gas is increased by a water-gas process. The installation also contains a heat-exchanger 24 and a quenching means 25.

Figure 3:
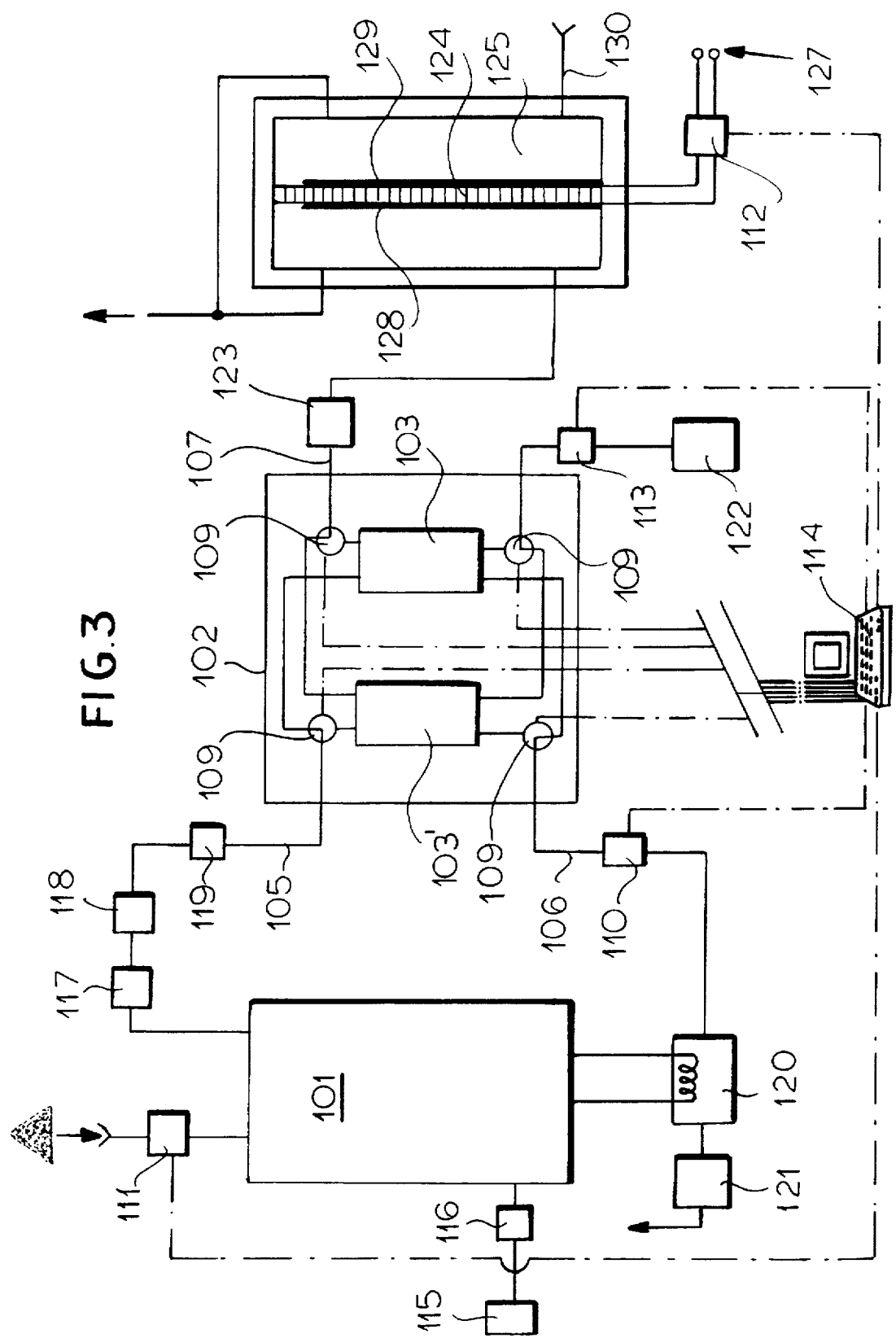
FIG. 3 is a further clarification of the functional diagram according to FIG. 2.

The method illustrated in FIG. 3 can be embodied in the invention. In this method, electric energy is generated from the hydrogen by means of fuel cells. FIG. 3 initially shows an oxidation reactor module 101 for producing a raw fuel gas containing hydrogen and carbon monoxide, from biomass by means of an oxygen containing gasification agent. In the exemplified embodiment, the oxidation reactor module operation is allothermic. For this purpose, water vapor is fed to the oxidation reactor module from a steam generator 115 via a gasification agent flow control element 116. The biomass is fed via a biomass flow control element 111.

A reformer module 102 for storing the hydrogen from the raw fuel gas in reformer elements 103, 103' by reaction with a storage material is connected to the oxidation reactor module via a cyclone filter 117, a tar filter 118 and a condenser 119. For this purpose, a raw fuel gas supply line 105 is provided. Substances in suspension are separated from the raw fuel gas by the cyclone filter 117. The tar filter 118 removes unwanted minor tar residues from the raw fuel gas. Water-vapor residues in the raw fuel gas from the allothermic gasification in the oxidation reactor module 101 are separated by the condenser 119. The reformer elements 103, 103' are constructed as iron sponge reactors.

In a reformer element 103 connected to the oxidation reactor 101 the hydrogen from the raw fuel gas is stored in the form of elementary iron sponge by reduction of iron oxide. The latent hydrogen present in the form of carbon monoxide also reduces the iron oxide to form elemental iron sponge. The use of iron sponge reactors as reformer elements 103 is advantageous because the pore structure of the iron sponge is suitable for filtering the residues of noxious substances out of the raw fuel gas. The raw fuel gas flowing via a raw fuel gas discharge line 106 out of a reformer element 103 connected to the oxidation reactor module 101 may contain constituents which still can be used, more particularly hydrogen, and also methane. In this exemplified embodiment, these components which are still usable are used in a combustion means with heat-exchanger 120 in order to supply the oxidation reactor module 101 with the heat energy required for the allothermic gasification. The waste gas from the combustion means 120 is passed through a waste gas purifier 121 in which the carbon dioxide, in particular, can be separated. The waste gas thus purified can be discharged to the environment.

In the exemplified embodiment, the reformer module 102 comprises a second reformer element 103'. The latter connected to a fuel-cell module 104. A hydrogen-containing pure fuel gas which is practically free from carbon can be discharged from the second reformer element 103' via a pure fuel gas discharge line 107. For this purpose, the reformer module 102 comprises a water-vapor supply line 108 by means of which water vapor is admitted to the reformer element 103'. Reaction of the iron sponge with the water results in the formation of the pure fuel gas hydrogen. The water-vapor generation takes place in a water-vapor generator 122. The pure fuel gas discharged from the reformer element 103 is fed to the fuel-cell module 104 via the pure fuel gas discharge line 107 and circulated in the fuel-cell module 104. The latter comprises at least one low-temperature fuel cell.

The exemplified embodiment contains a PEM fuel cell 125. To generate the electric energy, the pure fuel gas is passed over the anode 128 disposed on one side of the polymer membrane 124 of the fuel cell 125. A cathode 129 is disposed on the opposite side of the polymer membrane 124. Oxygen, preferably atmospheric oxygen, is passed over this cathode by means of a combustion agent supply line 130. As a result, the pure fuel gas hydrogen is oxidised to water in the space of the fuel cell 125 on the cathode side. This results in electrical energy which can be withdrawn at the connection 127. A condenser 123 for separating water vapor from the pure fuel gas can be provided in the pure fuel gas discharge line 107. Of course it is advisable to leave a minimum quantity of water in the pure fuel gas, since the membrane 124 of the PEM fuel cell 124 must not dry out.

The control apparatus comprises a first control means for controlling the production of raw fuel gas in accordance with the reaction of the hydrogen with the storage material and a second control means for controlling the discharge of pure fuel gas according to the electrical energy withdrawn from the fuel-cell module 104. The first control means comprises a gas sensor 110, preferably a CO sensor, in the raw fuel gas discharge line 106, a biomass flow control element 111 in the oxidation reactor module and a first controller. The second control means comprises a voltage sensor 112 for measuring the voltage generated by the fuel-cell module 104, a steam flow control element 113 in the water-vapor supply line 108 and a second controller. The first and second controllers are constructed as a single computer unit 114. The operation of the two control means is such that, on the one hand, the production of raw fuel gas is controlled according to the reaction of the hydrogen with the storage material and, on the other hand, the discharge of the pure fuel gas is controlled separately in accordance with the electric energy withdrawn from the fuel-cell module 104.

In detail, the gas sensor 110 measures the progress of reduction in the reformer element 103 connected to the oxidation reactor module 101. If raw fuel gas is produced at a rate higher than the corresponding reduction rate in the reformer element 103, then, for example, the carbon monoxide content in the raw fuel gas discharge line 106 rises. The computer unit 114 then reduces the supply of biomass to the oxidation reactor module 101 via the biomass flow control element 111, and vice versa. Alternatively, the control can be effected via the gasification agent flow control element 116. In the second control means, the voltage sensor 112 measures a voltage drop at high load at connection 127 compared with the nominal voltage. If this voltage drop rises, the computer unit 114 controls the steam flow control element 113 in such manner that more water vapor is fed via the water vapor supply line 108 to the reformer element 103 connected to the fuel cell module 104.

Finally, it will be apparent from the drawing that means 109 are provided to switch over the raw fuel gas supply line 105 and the raw fuel gas discharge line 106, on the one hand, and the pure fuel gas discharge line 107 and the water-vapor supply line 108, on the other hand, between different iron sponge reactors. Through the agency of these switching means 109 the two reformer elements 102 are connected to the oxidation reactor module 101 or to the fuel-cell module 104 in accordance with the amount of hydrogen stored. As soon as a reformer element 103' connected to the fuel-cell module 104 has been substantially oxidized, it is separated from the fuel-cell module 104 by the switching means 109 and connected to the oxidation reactor module 101. Conversely, in the event of substantial reduction, a reformer element 103 connected to the oxidation reactor module 101 is separated from the latter and, if necessary, connected to the fuel-cell module 104. To control the switching means 109 it is advantageous to use the voltage sensor 112 and the gas sensor 110. The switching means 109 are then also controlled by the computer unit 114. Of course, within the control steps of the invention it is possible to use different sensor means from those in the exemplified embodiment.

I claim:

1. A modular power station primarily for production of hydrogen using solar energy, said power station comprising:
   a conversion module for converting solar energy to biomass, said conversion module comprising:
      an agricultural cultivation plot of C4 plants convertible into biomass,
      a harvesting unit for harvesting said plants from said plot as biomass, and
      a processing unit receiving said biomass from said harvesting unit for transforming said biomass into a pregasification product, said processing unit comprising:
         at least one device selected from a chopping device and a pelletizing device for preparing said pregasification product, and
         means for storing said pregasification product and dimensioned to compensate for fluctuations in amount of processed biomass due to growth conditions;
   an allothermic gasification module operating at the lowest temperature at which said processed biomass is gasified in the presence of water vapor to obtain a hydrogen-containing fuel gas with at least 50% hydrogen, said gasification module comprising:
      a gasification reactor for transforming said pregasification product into said hydrogen-containing fuel gas and operable at a temperature and for a residence time of said product in said reactor sufficient to suppress tar condensation downstream of a gasification zone of said reactor,
      a loading device between said processing unit and said gasification module for supplying said pregasification product from said processing unit to said gasification reactor,
      means for generating said water vapor with a partial stream of said fuel gas, and
      means selectively utilizing another partial stream of said fuel gas or waste heat for drying harvested biomass; and
   a storage module connected to said gasification module by a fuel-gas purifier and storing the fuel gas or hydrogen derived from the fuel gas, said storage module having a capacity matched to a capacity of said gasification module,
   said conversion module, said gasification module and said storage module having main components prefabricated as modular units which are transportable selectively in an assembled and a disassembled state.

2. The modular power station defined in claim 1, further comprising means for separating hydrogen from said fuel gas and storing the separated hydrogen.

3. The modular power station defined in claim 2 wherein said means for storing the separated hydrogen is a metal hydride.

4. The modular power station defined in claim 1, further comprising means for drying said pregasification product heated by said waste heat.

* * * * *